United States Patent [19]
Hashimoto

[11] Patent Number: 5,904,233
[45] Date of Patent: May 18, 1999

[54] CLUTCH COVER ASSEMBLY HAVING A WEAR COMPENSATION MECHANISM WITH DIAPHRAGM SPRING ATTITUDE CONTROL

[75] Inventor: Yasuyuki Hashimoto, Neyagawa, Japan

[73] Assignee: Exedy Corporation, Neyagawa, Japan

[21] Appl. No.: 08/815,169

[22] Filed: Mar. 11, 1997

[30] Foreign Application Priority Data

Mar. 14, 1996 [JP] Japan .................................. 8-057072
Mar. 19, 1996 [JP] Japan .................................. 8-062584

[51] Int. Cl.⁶ .................................................. F16D 16/32
[52] U.S. Cl. .................................. 192/70.25; 192/111 A
[58] Field of Search ............................ 192/70.25, 89.24, 192/111 A

[56] References Cited

U.S. PATENT DOCUMENTS

| | | | |
|---|---|---|---|
| 5,377,803 | 1/1995 | Link et al. ............................ | 192/111 A |
| 5,419,418 | 5/1995 | Uenohara et al. . | |
| 5,431,268 | 7/1995 | Mizukami et al. . | |
| 5,450,934 | 9/1995 | Maucher . | |
| 5,513,736 | 5/1996 | Mizukami ........................ | 192/70.23 X |
| 5,568,852 | 10/1996 | Tomiyama ............................ | 192/70.25 |
| 5,570,768 | 11/1996 | Uenohara et al. . | |
| 5,586,633 | 12/1996 | Mizukami et al. . | |
| 5,690,203 | 11/1997 | Link et al. ............................ | 192/70.25 |

FOREIGN PATENT DOCUMENTS

| | | |
|---|---|---|
| 0 693 631 A2 | 1/1996 | European Pat. Off. . |
| 2 599 446 | 12/1987 | France . |
| 44 18 026 A1 | 12/1994 | Germany . |
| 195 19 863 A1 | 5/1995 | Germany . |
| 2 176 256 | 12/1986 | United Kingdom . |

*Primary Examiner*—Charles A. Marmor
*Assistant Examiner*—Saúl Rodríguez
*Attorney, Agent, or Firm*—Shinjyu An Intellectual Property Firm

[57] ABSTRACT

In a first embodiment, a restricting mechanism (7) includes bolts (13) and bushings (14). The bushings (14) are axially and frictionally engaged with the clutch cover (2), and restrict movement of the fulcrum ring (5) toward the flywheel (51). The bolts (13) are fixed to the pressure plate (3). Heads (13a) of the bolts (13) are in contact with sides of the bushings (14) remote from the flywheel (51). In another embodiment, a restricting mechanism (107) of a clutch cover assembly (100) includes a bolt (113), a bushing (114) and a sleeve (115). The bolt (113) has a head (113a) in contact with a surface of a clutch cover (102) remote from a flywheel (151). The bolt (113) is screwed into the sleeve (115) arranged near a pressing surface (103) of a pressure plate (103). The bushing (114) is fitted under pressure into an aperture 103c in the pressure plate (103), and is unmovably engaged between the bolt (113) and the sleeve (115).

25 Claims, 12 Drawing Sheets

CLUTCH COVER ASSEMBLY HAVING A WEAR COMPENSATION MECHANISM WITH DIAPHRAGM SPRING ATTITUDE CONTROL

BACKGROUND OF THE INVENTION

A. Field of the Invention

The present invention relates to a clutch cover assembly, and in particular to a clutch cover assembly provided with a friction surface wear compensation mechanism that maintains a diaphragm spring at a predetermined, generally constant attitude with respect to the clutch cover with the clutch cover assembly in a clutch engaged state.

B. Description of the Background Art

In general, a clutch cover assembly is fixed to a flywheel of an engine, and is used for selectively transmitting torque power from the engine to a transmission through friction facings of the clutch disk assembly that is selectively engaged and dis-engaged from rotation with the flywheel. It is always desirable to increase the life-expectancy of the clutch cover assembly and the clutch disk assembly. For this reason, some clutch disk assemblies have employed friction facings which are fixed to cushioning plates without using rivets for increasing effective thicknesses of the friction facings.

As the friction facings wear, the clutch engagement position of the pressure plate moves closer to the flywheel since the friction facing thickness diminishes. As a result, an attitude or deflection orientation of the diaphragm spring changes as it biases the pressure plate in the clutch engagement position toward the flywheel. As the attitude or orientation of the diaphragm spring changes, the biasing force it imparts against the pressure plate may likewise change. A friction following or compensating mechanism has been employed for preventing change in position of the diaphragm spring due to wear of the friction facings by moving a support member, which supports a side of the diaphragm spring near the clutch cover toward the flywheel, in accordance with the wear. The friction following mechanism includes a wedge mechanism supporting the side of the diaphragm spring near the clutch cover. The wedge mechanism continuously biases the support member toward the diaphragm spring by a centrifugal force or an elastic force of a spring, for instance as shown in U.S. Pat. Nos. 5,586,633, 5,431,268, 5,570,768 and 5,419,418, which are incorporated herein by reference. As the friction facing wears in the clutch cover assembly, the pressure plate moves toward the flywheel. Thereby, the diaphragm spring changes its position. When a releasing or disengaging operation is performed, the diaphragm spring in the changed attitude exerts an altered force. This altered force from the diaphragm spring tends to form a space between a member of the wedge mechanism and the diaphragm spring, and this space is filled by movement of wedge members of the wedge mechanism. In this manner, the initial attitude of the diaphragm spring is kept.

In the conventional structure described above, an amount or distance of movement of the support member supporting the diaphragm spring depends on the load balance between the diaphragm spring and the wedge mechanism, and therefore may not always precisely correspond to the amount or thickness of wear of the friction member. This leads to imprecise compensation of the changes in the diaphragm spring attitude due to wear of the friction member.

In a clutch cover assembly disclosed in U.S. Pat. Nos. 5,586,633 and 5,431,268, the wedge mechanism also includes a fulcrum ring disposed between the clutch cover and the diaphragm spring, a biasing mechanism for biasing the fulcrum ring away from the pressure plate, and a restricting mechanism for preventing movement of the fulcrum ring away from the pressure plate and allowing the fulcrum ring to move a distance, which is equal to an amount of wear caused at the friction facing, axially away from pressure plate. Parts forming the restricting mechanism are engaged with the pressure plate. These parts are specifically a bolt having a head opposed to a side of an arm of the fulcrum ring near the clutch cover, a wedge fixed to the bolt, and a wedge collar disposed radially outside the wedge and inserted into an aperture in the clutch plate. An end of the wedge collar is in contact with a frictional surface of the flywheel. The wedge has an outer peripheral surface which is tapered and diverges toward the flywheel, and the wedge collar has a tapered inner peripheral surface which is in close contact with the tapered surface of the wedge.

In this structure, when a friction facing of the clutch disk assembly wears to some extent, the pressure plate and the fulcrum ring move toward the flywheel with respect to the restricting mechanism supported by the flywheel, so that a space is formed between the head of the bolt and the arm of the fulcrum ring. In a subsequent releasing operation, the fulcrum ring biased by the biasing mechanism moves axially until it is brought into contact with the head of the bolt. As described above, the fulcrum ring axially moves a distance generally equal to an amount of wear with respect to the pressure plate, but the diaphragm spring may not change its attitude with regard to wear of the friction facing.

In the releasing operation before wearing of the friction facing, when the biasing mechanism exerts a load on the bolt, the wedge is axially pulled to spread the wedge collars by the tapered surface, so that a friction between the wedge collar and an inner periphery of the aperture of the wedge plate increases. As a result, movement of the whole restricting mechanism is restricted.

As described above, when wear occurs, the pressure plate moves with respect to the restricting mechanism of which wedge collar is supported by the flywheel. Since the wedge collar is in contact with the friction surface of the flywheel, it is liable to be adversely affected by heat of the flywheel.

SUMMARY OF THE INVENTION

One object of the present invention is to provide a clutch cover assembly provided with a wear compensation mechanism, which allows for movement of a support member supporting a diaphragm spring to move as precisely as possible in accordance with an amount of wear of a corresponding clutch disc assembly.

Another object of the invention is to reduce the influence of heat produced by a flywheel and clutch mechanism on a wear compensation mechanism.

In accordance with one aspect of the present invention, a clutch cover assembly for engaging and dis-engaging a friction member with a flywheel includes a clutch cover configured to be connected to a flywheel. A pressure plate is disposed within the clutch cover, the pressure plate provided with a friction engaging surface for engagement with a friction member. A diaphragm spring is also disposed in the clutch cover for biasing the pressure plate toward the flywheel. A fulcrum ring is disposed between the pressure plate and the clutch cover, the diaphragm spring pivotable about a portion of the fulcrum ring. A biasing mechanism is disposed within the clutch cover for urging the fulcrum ring the diaphragm spring toward the flywheel. A restricting mechanism is supported on the pressure plate, the restricting mechanism also supporting the fulcrum ring and being frictionally engaged with the clutch cover for restricting movement of the fulcrum ring with respect to the clutch cover, the restricting mechanism moving with respect to the clutch cover in response to wear of the friction member.

Preferably, the restricting mechanism includes a bolt threaded into the pressure plate and extending through an aperture formed in the clutch cover and a bushing disposed about the bolt and frictionally engaged within the aperture in the clutch cover.

Preferably, the fulcrum ring is formed with a second aperture through which the bushing and the bolt extend, and the second aperture has a diameter larger than the aperture in the clutch cover. The bolt has a body fixed to the pressure plate and extends through the first and second apertures. A head of the bolt is spaced from a transmission side of the clutch cover by a predetermined distance and the head has a larger diameter than the aperture in the clutch cover. The bushing is force fitted into the aperture in the clutch cover, the bushing being formed with a contact portion in contact with a portion of the fulcrum ring near the flywheel, and the bushing having an end remote from the flywheel contactable with the head.

In accordance with another aspect of the present invention, a clutch cover assembly for engaging and disengaging a friction member with a flywheel includes a clutch cover configured to be connected to a flywheel and a pressure plate disposed within the clutch cover, the pressure plate provided with a friction engaging surface for engagement with a friction member. A diaphragm spring is disposed in the clutch cover for biasing the pressure plate toward the flywheel. A fulcrum ring is disposed between the pressure plate and the diaphragm spring, the diaphragm spring pivotable about a portion of the fulcrum ring. A biasing mechanism is disposed between the pressure plate and the fulcrum ring for urging the fulcrum ring away from the flywheel. A restricting mechanism is supported on the clutch cover, the restricting mechanism also supporting the fulcrum ring and being frictionally engaged with the pressure plate for restricting movement of the pressure plate with respect to the fulcrum ring, the restricting mechanism moving with respect to the clutch cover in response to wear of the friction member.

Preferably, the restricting mechanism includes a bolt extending into a first aperture formed in the clutch cover, the bolt further extending into a bushing, the bolt and bushing extending through a second aperture formed in the pressure plate, and the bushing frictionally engaged within the second aperture formed in the pressure plate.

Preferably, the fulcrum ring is formed with a third aperture through which the bolt extends, and the third aperture has a diameter larger than the second aperture. The bolt has a body extending through the first, second and third apertures, and a head contacting a transmission side of the clutch cover and the head has a larger diameter than the first aperture. The bushing is force fitted into the second aperture.

Preferably, the clutch cover assembly further includes a strap plate connected to the clutch cover and the strap plate connected to the restricting mechanism between the pressure plate and the fulcrum ring.

Preferably, the clutch cover assembly further includes a strap plate connected to the clutch cover and the strap plate connected to the restricting mechanism between the clutch cover and the fulcrum ring.

Preferably, the diaphragm spring and the fulcrum ring are configured for use in a pull type clutch mechanism.

Preferably, the diaphragm spring and the fulcrum ring are configured for use in a push type clutch mechanism.

The foregoing and other objects, features, aspects and advantages of the present invention will become more apparent from the following detailed description, when taken in conjunction with the accompanying drawings.

DESCRIPTION OF THE PREFERRED EMBODIMENTS

FIRST EMBODIMENT

Figure 1:
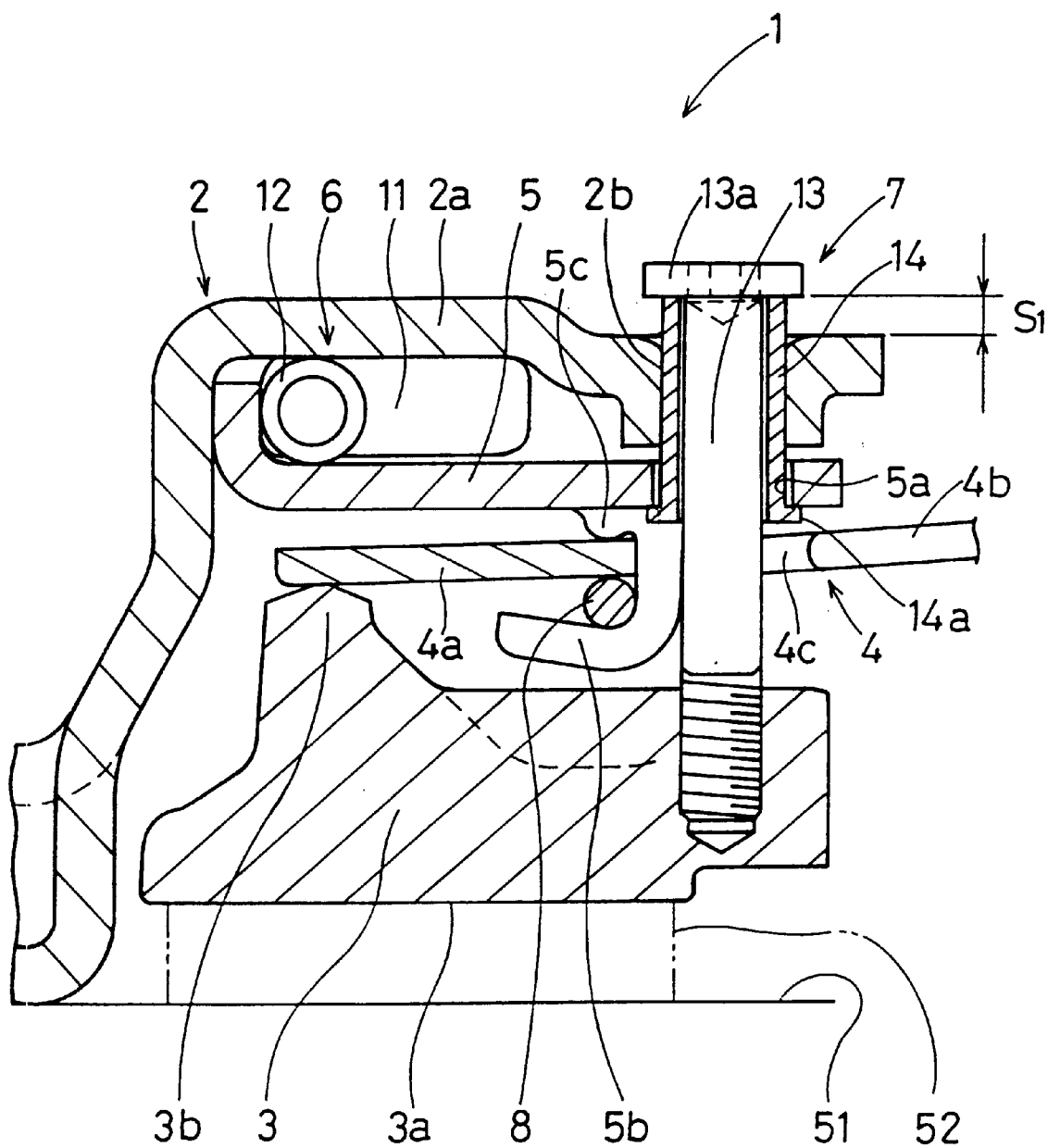
FIG. 1 is a fragmentary, schematic cross section of a portion of a clutch cover assembly of a first embodiment of the present invention.

FIG. 1 shows a clutch cover assembly 1 of an embodiment of the invention. More specifically, FIG. 1 shows a set or engaged state in which a friction facing 52 of a clutch disk assembly (not shown) is pressed into engagement against a flywheel 51. It should be appreciated that only a portion of the clutch cover assembly 1 is shown in FIG. 1. A center line (not shown) about which the clutch cover assembly 1 rotates is located to the right of FIG. 1. An engine (not shown) is disposed under the flywheel 51 and a transmission (not shown) is disposed toward the top of FIG. 1. Hereinafter, the upper part of FIG. 1 will be referred to as the transmission side and the lower part of FIG. 1 will be referred to as the engine side. These directions are likewise applicable to FIGS. 2 and 3.

A clutch cover assembly having features similar those of the present invention is disclosed in four patents commonly assigned to the assignee of the present application. The four patents are U.S. Pat. No. 5,431,268 (Ser. No. 117,425, filed Sep. 7, 1993) and U.S. Pat. No. 5,586,633 (Ser. No. 417,993, filed Apr. 6, 1995) both to Mizukami et al., and U.S. Pat. No. 5,419,418 (Ser. No. 85,649 Jun. 30, 1993) and U.S. Pat. No. 5,570,768 (Ser. No. 392,049, filed Feb. 22, 1995) both to Uenohara et al. and all assigned to Kabushiki Kaisha Daikin Sesakusho, now renamed Exedy Corporation. The disclosures of U.S. Pat. Nos. 5,431,268, 5,586,633, 5,419,418, and 5,570,768 are all herein incorporated by reference, in particular those features relating to a biasing mechanism having circumferentially oriented wedge members, as is mentioned below.

A clutch cover assembly 1 includes a clutch cover 2 having an outer peripheral portion fixed to the flywheel 51 of an engine, a pressure plate 3 arranged in a clutch cover 2, a diaphragm spring 4 for pressing the pressure plate 3 toward the flywheel 51, a fulcrum ring 5 supporting a side of the diaphragm spring 4 near the clutch cover 2, a biasing mechanism 6 for biasing the fulcrum ring 5 toward the flywheel 51, and a restricting mechanism 7 which restricts movement of the fulcrum 5 toward the flywheel 51 with respect to the clutch cover 2, but allows movement thereof corresponding to an amount of wear of the friction facing 52.

The clutch cover 2 is a plate member having a dish-like shape, and has an outer peripheral portion fixed to the flywheel 51 by unillustrated bolts. The clutch cover 2 is provided at an annular portion 2a with a central aperture of a large diameter. The clutch cover 2 is also provided at an inner peripheral portion of the annular portion 2a with a plurality of first circular apertures 2b which are circumferentially equally spaced apart from each other.

The pressure plate 3 has a substantially annular form, and is unrotatably and axially (upward direction in FIG. 1) movably fixed to the clutch cover 2 via strap plates (not shown). The strap plates bias the pressure plate 3 away from the flywheel 51. The pressure plate 3 has a pressing surface 3a for pressing the friction facing 52 of the clutch disk assembly against the flywheel 51. The pressure plate 3 is provided at a transmission side (i.e., upper portion in FIG. 1) with a circumferentially extending projection 3b.

The diaphragm spring 4 (pressing member) is disposed concentrically with the clutch cover 2. The diaphragm spring 4 is formed with an annular elastic portion 4a and a plurality of lever portions 4b extending radially inward from the elastic portion 4a. The outer peripheral portion of the elastic portion 4a is in contact with the projection 3b of the pressure plate 3. The inner peripheral portion of the elastic member 4a is supported by the fulcrum ring 5 which will be described below in greater detail. Slits are formed between the lever portions 4b, and a nearly square aperture 4c having round corners is formed at a radially outer portion of each slit.

The fulcrum ring 5 (support member) is a circular plate member, having a generally annular shape. The fulcrum ring 5 is disposed between the outer peripheral portion of the diaphragm spring 4 and the annular portion 2a of the clutch cover 2. The fulcrum ring 5 is provided at its inner peripheral portion with second circular apertures 5a located at positions corresponding to the first apertures 2b in the clutch cover 2, respectively. The second aperture 5a has a larger diameter than the first aperture 2b. The fulcrum ring 5 is provided at its inner periphery with a plurality of bent tabs 5b. The bent tab 5b extends through a radially outer portion of the nearly square aperture 4c in the diaphragm spring 4, and has an end portion which is bent radially outward and retains a wire ring 8. The wire ring 8 is in contact with a surface of the annular elastic portion 4a, as shown in FIG. 1. The fulcrum ring 5 is provided at its inner peripheral portion with a support portion 5c which is in contact with a surface of the elastic member 4a.

The biasing mechanism 6 is basically formed of a ring member 11 disposed near the clutch cover 2 and a coil spring 12. Although not shown, a circumferentially extending wedge mechanism is disposed between the ring member 11 and the fulcrum ring 5. The wedge mechanism is formed of first and second wedges which are fixed to the ring member 11 and the fulcrum ring 5, respectively. The wedge mechanism is similar to those described in U.S. Pat. Nos. 5,431, 268, 5,586,633, 5,419,418, and 5,570,768, which are all incorporated by reference. Therefore, the wedge mechanism will not be specifically described again herein. The coil spring 12 circumferentially biases the first and second wedges to each other. As a result, the wedge mechanism biases the fulcrum ring 5 axially away (downward in FIG. 1) from the annular portion 2a of the clutch cover 2.

The restricting mechanism 7 is basically formed of bolts 13 and bushings 14. Each bolt 13 (or engaging member) is fixed to the pressure plate 3 and is located at a position corresponding to the first and second apertures 2b and 5a as well as the nearly square aperture 4c. A shank of each bolt 13 extends through the first and second apertures 2b and 5a as well as the nearly square aperture 4c, and projects beyond the annular portion 2a of the clutch cover 2 toward the transmission side. A head 13a of each bolt 13 is spaced from the clutch cover 2 by a space S1 in the state shown in FIG. 1.

The bushing 14 is slightly oversized and therefore must be forced into the first aperture 2b in the clutch cover 2. Thus, the bushing 14 engaged in the first aperture 2b in the clutch cover 2 is unmovable unless a force larger is exerted thereon. A predetermined space is established between the inner peripheral surface of the bushing 14 and the bolt 13. A space is defined between the outer peripheral surface of the bushing 14 and the inner periphery of the second aperture 5a in the fulcrum ring 5. An end of the bushing 14 near the transmission side is in contact with the head 13a of the bolt 13. The bushing 14 is provided at its end near the flywheel 51 with a flange 14a (or contact portion) which is in contact with the side surface of the fulcrum ring 5 near the flywheel 51. In this manner, the bushing 14 restricts movement of the fulcrum ring 5 toward the flywheel 51.

Friction resistance between the bushing 14 and the inner periphery of the first aperture 2b is predetermined to satisfy the following conditions. When the pressing force by the diaphragm spring 4 is exerted on the bushing 14 through the pressure plate 3 and the bolts 13 when the clutch is in an engaged state, the bushing 14 may undergo limited movement with respect to the clutch cover 2. When the load exerted by the diaphragm spring 4 and the biasing mechanism 6 is exerted on the bushing 14 through the fulcrum ring 5 in the clutch disengaged state, the bushing 14 is not movable with respect to the clutch cover 2.

Figure 2:
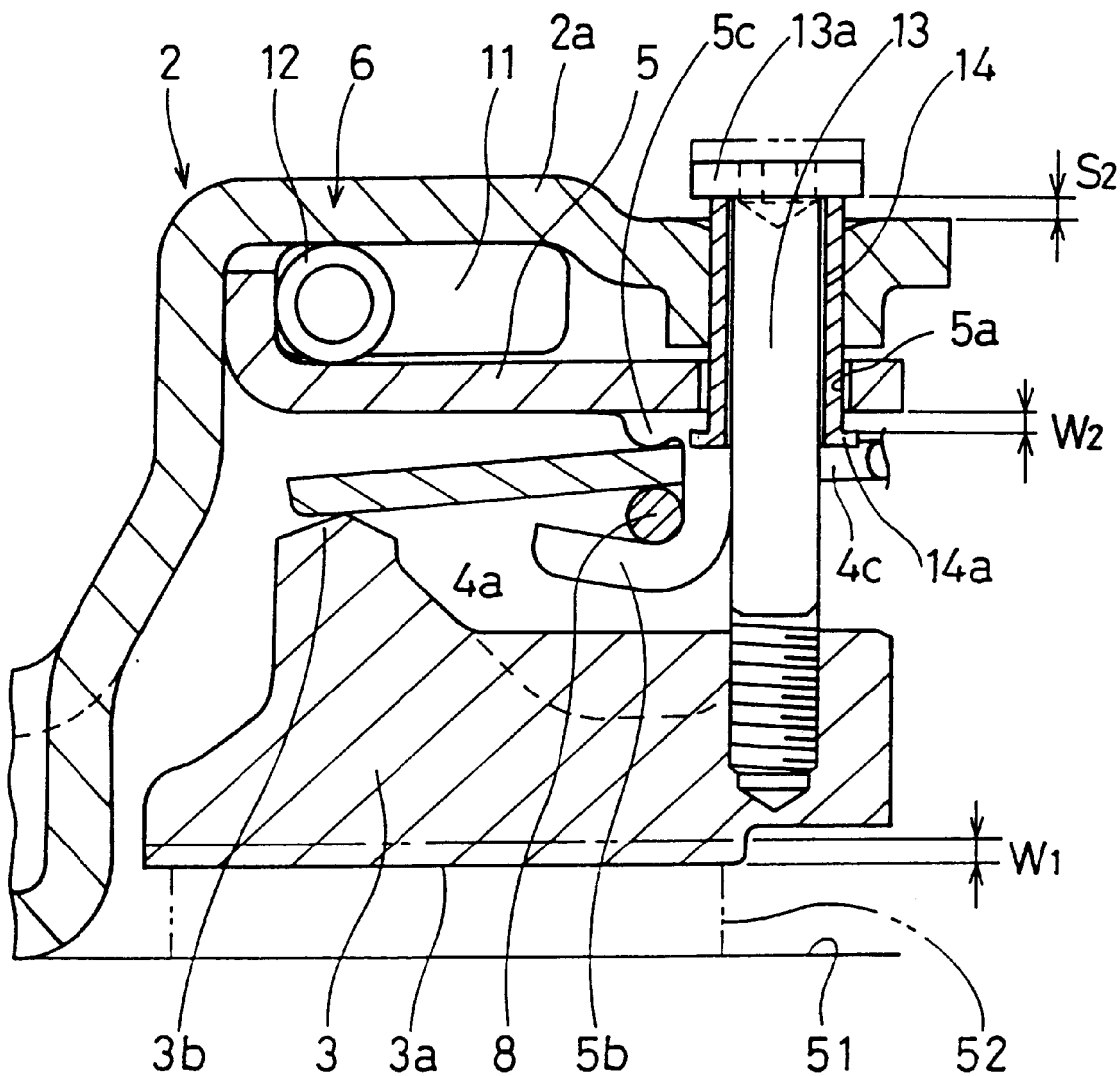
FIG. 2 is a fragmentary, schematic cross section of the clutch cover assembly depicted in FIG. 1, showing displacement of several components of the clutch cover assembly in response to wear of friction surfaces of a clutch disc assembly.

When wear W1 occurs at the friction facing 52 due to use of the clutch as shown in FIG. 2, the whole pressure plate 3 pressed by the diaphragm spring 4 moves toward the flywheel 51. In accordance with this, the bushing 14 pushed by the head 13a of the bolt 13 slides on the inner periphery of the first aperture 2b toward the annular portion 2a in the clutch cover 2. As a result, a space W2 corresponding to the wear W1 is formed between the flange 14a of the bushing 14 and the fulcrum ring 5.

In the subsequent releasing operation, the radially inner portions of the lever portions 4b of the diaphragm spring 4 are pushed toward the flywheel 51, so that the outer peripheral portion of the elastic member 4a no longer pushes the pressure plate 3 toward the flywheel 51. Thereby, the unillustrated strap plates move the pressure plate 3 away from the flywheel 51. As a result, the friction facing 52 of the clutch disk assembly is spaced from the flywheel 51, and the clutch is disengaged. When the fulcrum ring 5 is released from a load (i.e., upward load in FIG. 5) exerted by the inner peripheral portion of the circular portion 4a, the fulcrum ring 5 is moved toward the flywheel 51 by the biasing force of the biasing mechanism 6. Thus, the fulcrum ring 5 moves through the space W2 toward the flywheel 51, and stops when it is brought into contact with the flange 14a of the bushing 14.

Figure 3:
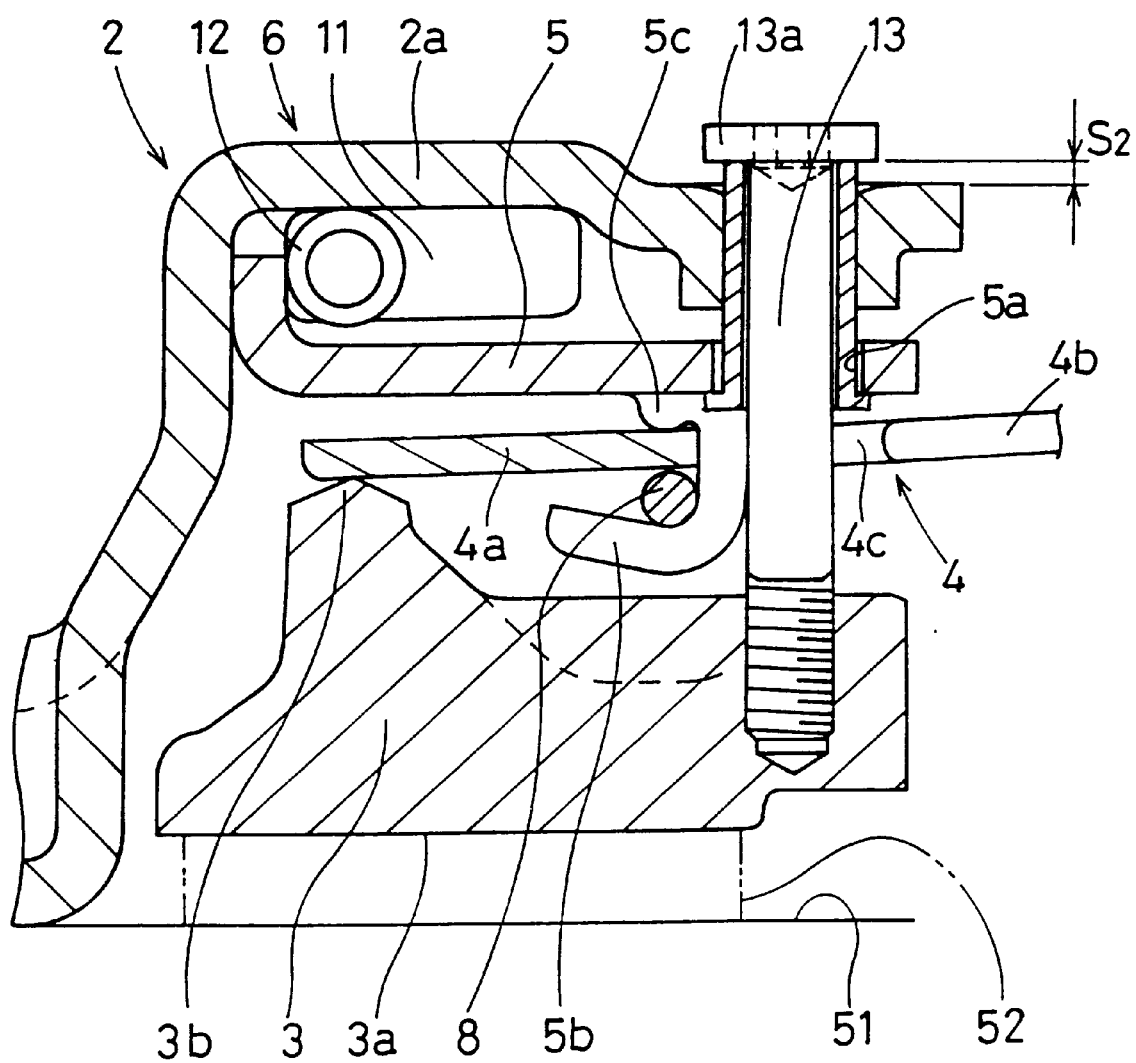
FIG. 3 is a fragmentary, schematic cross section of the clutch cover assembly depicted in FIGS. 1 and 2, showing further displacement of several components of the clutch cover assembly in response to wear of friction surfaces of the clutch disc assembly.
Figure 4:
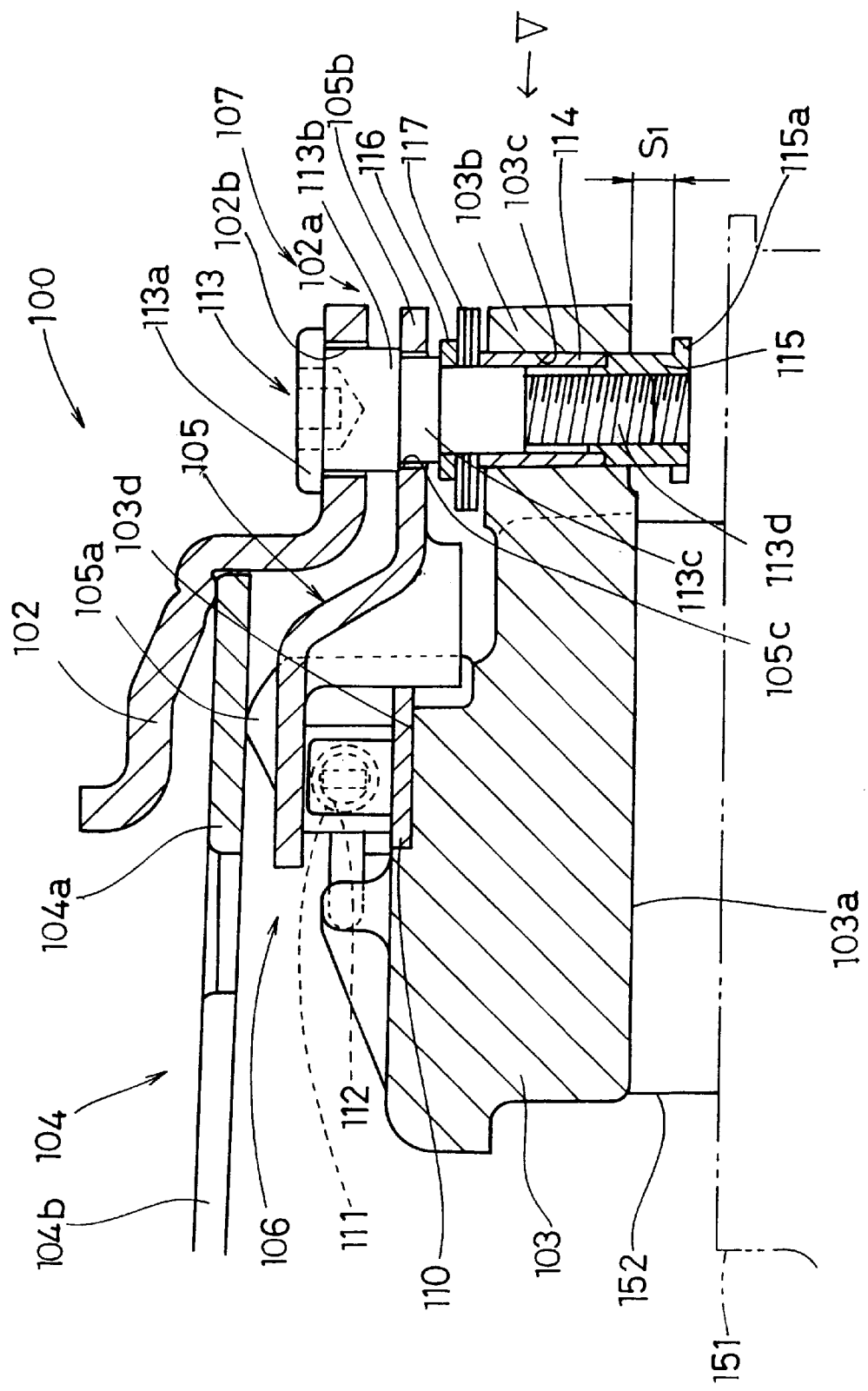
FIG. 4 is a fragmentary, schematic cross section of a portion of a clutch cover assembly of a second embodiment of the present invention.

When the unillustrated release device stops pushing of the ends of the lever portions 4b of the diaphragm spring 4 toward the flywheel 51 (to re-engage the clutch), the state shown in FIG. 3 is attained, so that the elastic portion 4a is compressed between the fulcrum ring 5 and the pressure plate 3 and thereby biases the pressure plate 3 toward the flywheel 51. In the set state shown in FIG. 3, the attitude or orientation (deflection) of the elastic portion 4a of the diaphragm spring 4 with respect to the fulcrum ring 5 and the pressure plate 3 is generally the same as that before wear, shown in FIG. 1. In this manner, the same generally attitude of the diaphragm spring 4 is kept regardless of wearing of the friction facing 52, so that a pressing load does not change.

Particularly in this embodiment, the fulcrum ring 5 moves a distance or amount W2 equal to the amount W1 of wear owing to the restricting mechanism 7, so that the attitude of the diaphragm spring 4 returns substantially to the attitude before wear. Further, the restricting mechanism 7 has a simple structure formed of the bolts 13 and the bushings 14, so that the total parts of the clutch cover assembly can be small in number.

In the state shown in FIG. 3, the space S2 between the head 13a and the annular portion 2a of the clutch disk 2 is equal to a difference between the initial space S1 and the amount W1 of wear.

As described above, the initial load and attitude of the diaphragm spring 4 are kept, so that the following effect can be achieved.

(a) The friction facing 52 can be sufficiently used until its wear reaches allowable limit, so that the clutch can have an increased life-time.

(b) Since the pressing load exerted by the diaphragm spring can be kept constant, the clutch can keep an intended torque transmitting performance during its operation life.

(c) The release characteristics do not change, so that the releasing operation can be always performed with a constant release load.

According to the clutch cover assembly of the invention, the restricting mechanism moves a distance equal to the amount of wear together with the pressure plate with respect to the clutch cover. Since the support member supporting the pressing member moves depending on the amount of wear of the friction member as described above, wearing can be compensated more precisely.

SECOND EMBODIMENT

FIGS. 4, 5, 6 and 7 show a clutch cover assembly 100 of a pull type clutch mechanism in accordance with a second embodiment of the present invention. The clutch cover assembly 100 is fixed to a flywheel 151 coupled to a crankshaft of an engine (not shown). A friction facing 152 of the clutch disk assembly is disposed between the flywheel 151 and the clutch cover 100. With respect to FIGS. 4, 6 and 7, the upper portion of each figure will hereinafter be referred to as the transmission side and the lower portion of each figure will be referred to as the engine side or flywheel side. The centerline (not shown) about which the clutch cover assembly 100 rotates is located toward the left side of FIGS. 4, 6 and 7.

The clutch cover assembly 100 basically has a clutch cover 102, a pressure plate 103, a diaphragm spring 104, a fulcrum ring 105, a biasing mechanism 106 and a restricting mechanism 107.

The clutch cover 102 has a substantially annular, dish-like shape, and has an outer periphery fixed to the flywheel 151 by, for instance, bolts (not shown). The clutch cover 102 is provided at its center with a central aperture having a large diameter. The clutch cover 102 is provided at an outer peripheral wall thereof with three circumferentially equally spaced three openings 102a as shown in FIG. 5.

The portions of the clutch cover 102 which extend radially outward around the openings 102a are formed with axially extending apertures 102b (first apertures).

Figure 5:
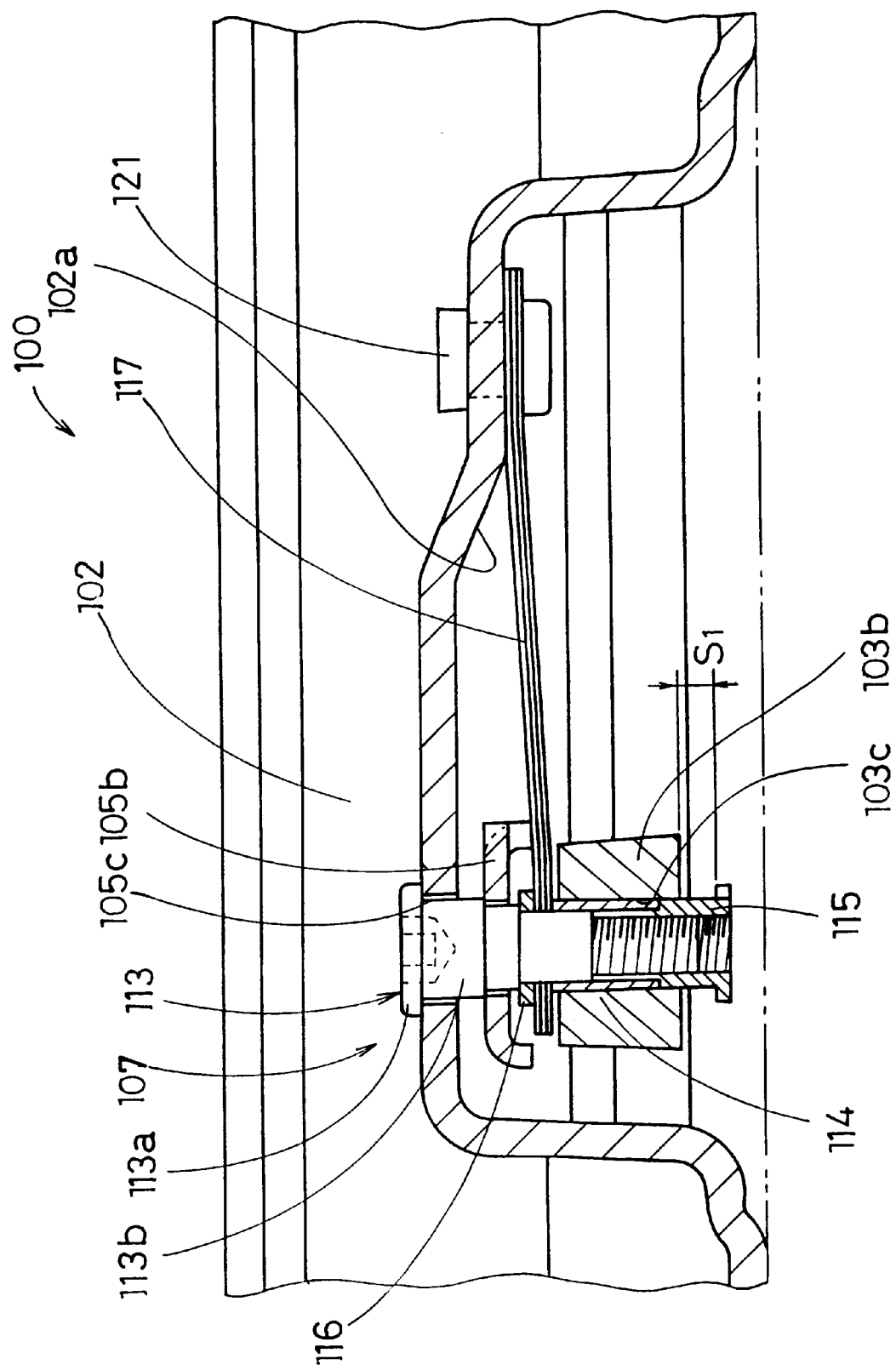
FIG. 5 is a fragmentary, part cross-sectional, part elevational side view of the clutch cover assembly depicted in FIG. 4, looking in the direction of the arrow V in FIG. 4.

Strap plates 117, made of layered steel plates, extend in a tangential direction relative to the pressure plate 103 at positions corresponding to each opening 102a, as shown in FIG. 5. One end of each strap plate 117 is fixed to the restricting mechanism 107 (described in greater detail below). The strap plates 117 are provided for connecting the pressure plate 103 to the clutch cover 102 such they rotate together. The strap plates 117 bias the pressure plate 103 away from the friction facing 152 and the flywheel 151 when the pressure plate 103 is released from the pressing force by the diaphragm spring 104. The strap plate 117 has a generally high rigidity in the circumferential direction, and is elastically deformable in the axial direction. A second end of the strap plate 117 is fixed to the clutch cover 102 by a rivet 121. The pressure plate 103 has a substantially annular shape, and is disposed in the clutch cover 102. The pressure plate 103 has a pressing surface 103a for pressing the friction facing 152 of the clutch disk assembly against the flywheel 151. An annular stepped portion 130 is formed at the outer peripheral portion of the other side surface of the pressure plate 103. The clutch cover 102 is also provided at its outer peripheral portion with three fixing portions 103b, which project toward the openings 102a in the clutch cover 102, respectively. An axially extending aperture 103c (third aperture) is formed at each fixing portion 103b.

The fulcrum ring 105 (support member) is made of a stamped circular plate, and is provided at its inner periphery with a plurality of support portions 105a which extend away from the flywheel 151 in an arc-shaped form. The fulcrum ring 105 has three projections 105b projecting toward the openings 102a in the clutch cover 102, respectively. Each projection 105b has an aperture 105c (second aperture), which is larger in diameter than the aperture 102b.

The biasing mechanism 106 includes a ring plate 110, a wedge mechanism 111 and a coil spring 112. The ring plate 110 is disposed rotatably inside the stepped portion 103d of the pressure plate 103. The wedge mechanism 111 is disposed between the ring plate 110 and the inner peripheral portion of the fulcrum ring 105. The wedge mechanism 111 is formed of a first wedge fixed to the ring plate 110 and a second wedge fixed to the fulcrum ring 105. The wedge mechanism 111 is similar to those disclosed in any of U.S. Pat. Nos. 5,431,268, 5,586,633, 5,419,418, and 5,570,768, which are incorporated herein by reference, and therefore, description thereof will be omitted. The coil spring 112 extends circumferentially, and biases the first wedge of the fulcrum ring 105 and the second wedge of the ring plate 110 circumferentially toward each other. As a result, the ring plate 110 is biased circumferentially with respect to the fulcrum ring 105, which in turn is biased by the wedge mechanism 111 away from the pressure plate 103, i.e., upward in FIG. 4.

The diaphragm spring 104 has a circular form and is arranged concentrically with the clutch cover 102. The diaphragm spring 104 is formed with an annular elastic portion 104a, and a plurality of lever portions 104b extending radially inward from the inner periphery of the elastic portion 104a. The outer peripheral portion of the elastic portion 104a is carried by the clutch cover 102, and the radially middle portion thereof is in contact with the support portion 105a of the fulcrum ring 105.

The restricting mechanism 107 restricts movement of the fulcrum ring 105 with respect to the pressure plate 103. When the friction facing 152 wears, the restricting mechanism 107 responds to the wear, and allows movement of the fulcrum ring 105 in accordance with the amount of wear. The restricting mechanism 107 is disposed in each opening 102a of the clutch cover 102, and is located at each of positions corresponding to the fixing portions 103b of the pressure plate 103 and the projections 105b of the fulcrum ring 105. Each restricting mechanism 107 is basically formed of a bolt 113, a bushing 114 and a sleeve 115. The bolt 113 (first member) extends through the aperatures 102b, 105c and 103c. A head (second contact portion) of each bolt 113 is in contact with a side surface of the clutch cover 102 near the transmission. A thick shank portion 113b (first contact portion) of the bolt 113 is disposed in the aperture 102b of the clutch cover 102 with a space around the same, and is in contact with the side surface of the fulcrum ring 105 near the transmission side. A thin shank portion 113c of the bolt 113 extends through the aperture 105c in the fulcrum ring 105 with a space around the same. A threaded portion 113d of the bolt 113 is screwed into a cylindrical sleeve 115. The sleeve 115 (second member) has a portion inserted into the aperture 103c of the pressure plate 103, and has a plurality of stop portions 115a at its portion near the flywheel 151. A space S1 is formed axially between the stop portion 115a and the fixing portion 103b. It is desirable that the space S1 is equal to or larger than the effective thickness of the friction facing 152. A predetermined space is ensured between the end of the sleeve 115 and the flywheel 151. A bushing 114 (engaging portion) is force fitted into the aperture 103c of the fixing portion 103b. An end of the bushing 114 near the flywheel 151 is in contact with the sleeve 115. An end of the strap plate 117 located near the bushing 114 and a washer 116 are arranged between the bushing 114 and the thin shank portion 113c of the bolt 113. In this manner, the bushing 114 is axially unmovably held between the bolt 113 and the sleeve 115.

The operation of the second embodiment is described below.

In the clutch engaged state, the elastic portion 104a of the diaphragm spring 104 presses the pressure plate 103 toward the flywheel 151 through the fulcrum ring 105. Thereby, the friction facing 152 of the clutch disk assembly is held between the flywheel 151 and the pressing surface 103a of the pressure plate 103. As a result, torque of the flywheel 151 is transmitted to the transmission through the clutch disk assembly 100.

In this operation, the end of the sleeve 115 of the restricting mechanism 107 is not brought into contact with the flywheel 151, so that the respective members of the restricting mechanism 107 are not likely adversely affected by heat from the flywheel 151. Also, the respective members of the restricting mechanism 107 are suppressed from receiving vibration of the flywheel 151.

When an unillustrated release device pulls the ends of lever portions 104b of the diaphragm spring 4 away from the flywheel 151, the fulcrum ring 105 and the pressure plate 103 are relieved of the pressing force of the diaphragm spring 104. Thereby, the bolt 113 biased by the strap plate 117 moves toward the transmission side. In this operation, the pressure plate 103 axially moves owing to frictional engagement between the bushing 114 and the inner periphery of the aperture 103c. As a result, the pressing surface 103a of the pressure plate 103 is spaced from the friction facing 152, and a torque is no longer transmitted to the clutch disk assembly 100. In this structure, since the frictional resistance exerted onto the bushing 114 from the inner periphery of the aperture 103c in the fixing portion 103b is predetermined to be larger than the biasing force by the strap plate 117, the restricting mechanism 107 does not move with respect to the pressure plate 103.

Figure 6:
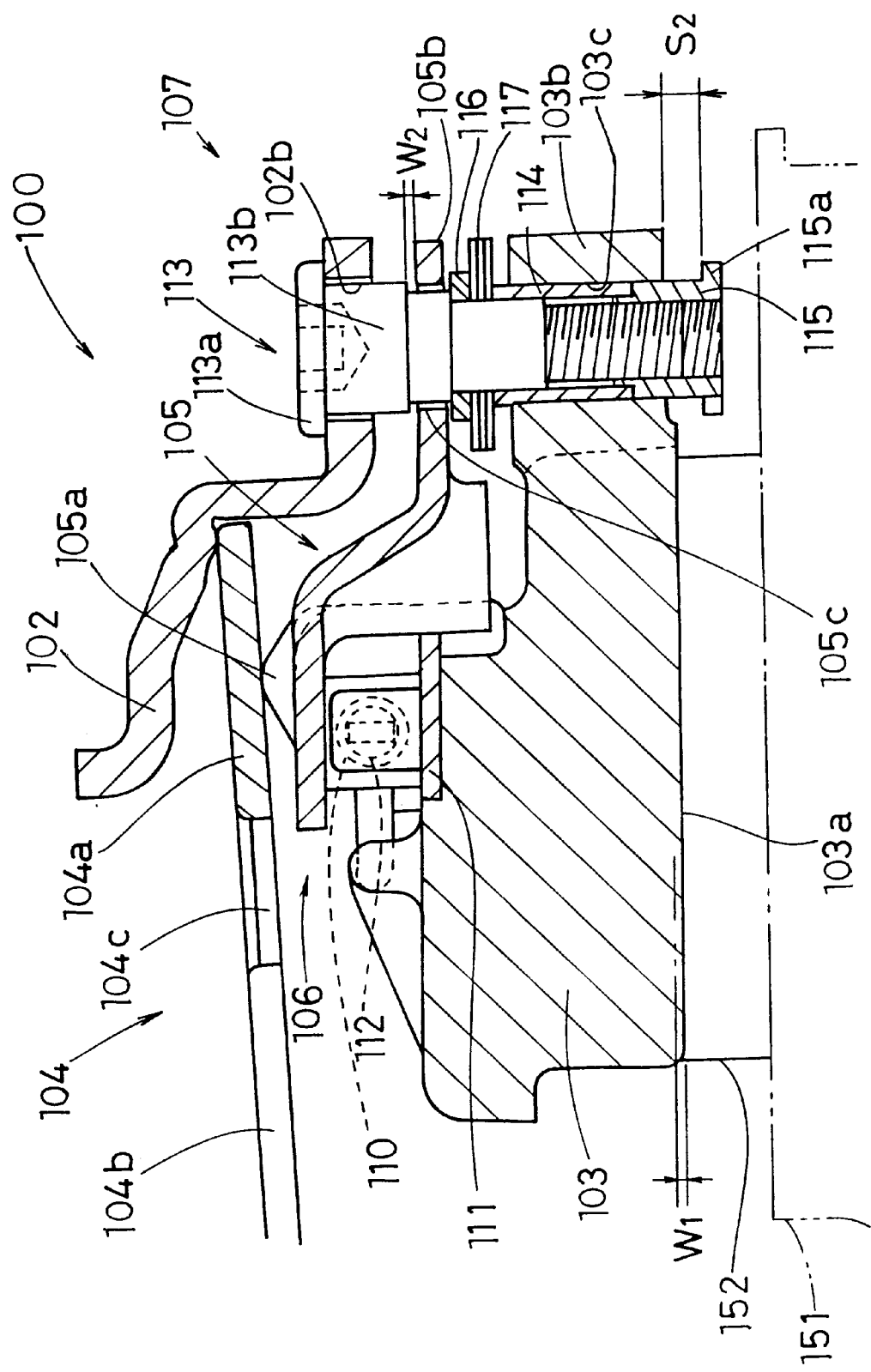
FIG. 6 is a fragmentary, schematic cross section of the clutch cover assembly depicted in FIG. 4, showing displacement of several components of the clutch cover assembly in response to wear of friction surfaces of a clutch disc assembly.

As shown in FIG. 6, when wear of an amount W1 is present at the friction facing 152 in the clutch engaged state, the fulcrum ring 105 and the pressure plate 103 pushed by the diaphragm spring 104 move toward the flywheel 151. At this time, the bolt 113 of the restricting mechanism 107 is engaged with the clutch cover 102, so that the bushing 114 does not follow the pressure plate 103. Thus, the inner periphery of the third aperture 103c slides on the bushing 114, so that the pressure plate 103 moves with respect to the bushing 114. As a result, a space W2 equal to an amount W1 of wear is formed between the thick shank portion 113b of the bolt 113 and the projection 105b of the fulcrum ring 105.

Figure 7:
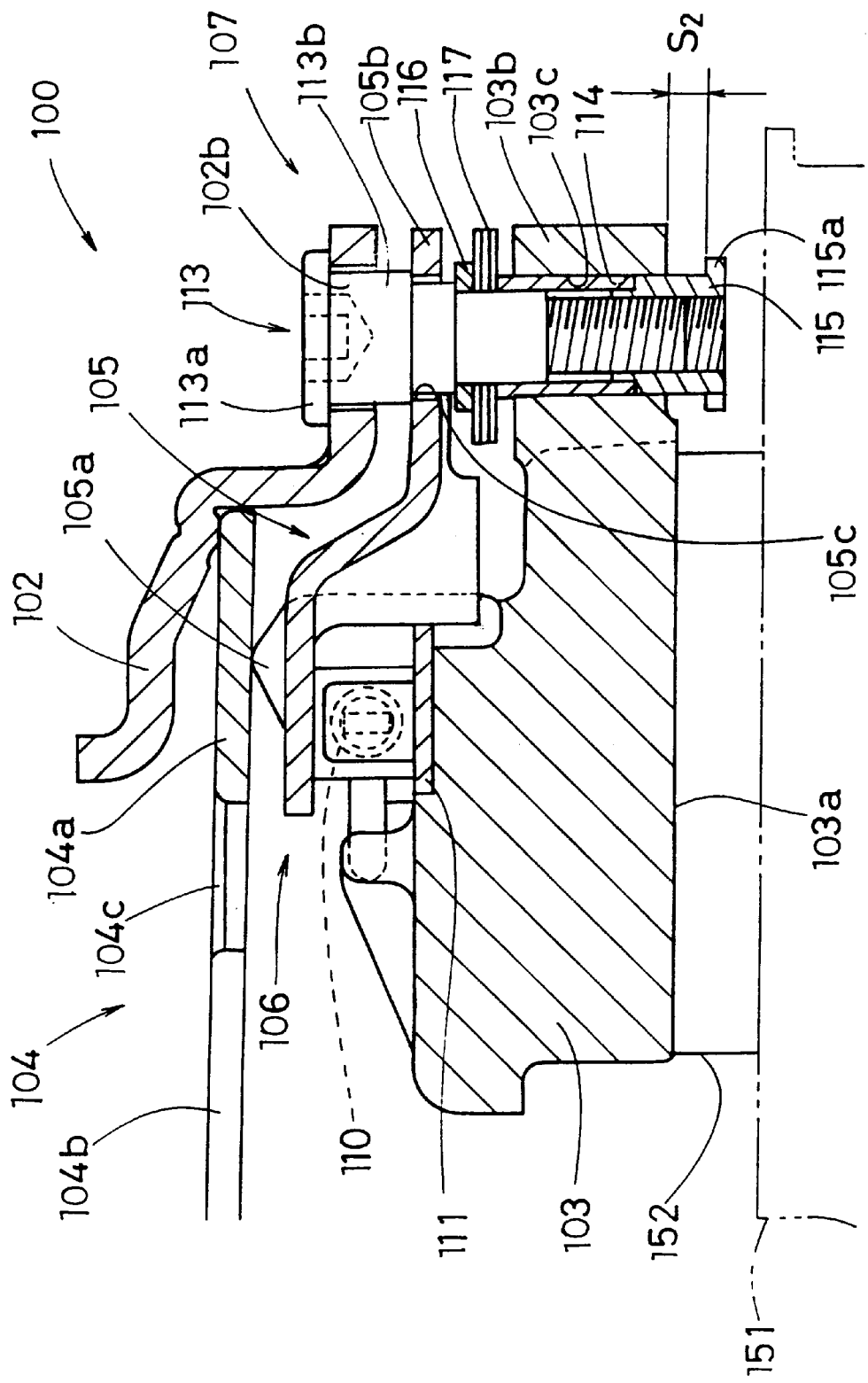
FIG. 7 is a fragmentary, schematic cross section of the clutch cover assembly similar to FIG. 6, showing displacement of several components of the clutch cover assembly in response to wear of friction surfaces of a clutch disc assembly

When the unillustrated release device pulls the ends of lever portions 104b of the diaphragm spring 104 toward the transmission side, the fulcrum ring 105 is released from the load exerted by the elastic portion 104a. As a result, the ring plate 111 biased by the coil spring 112 rotates circumferentially, so that the fulcrum ring 105 moves upward in FIG. 6 toward the transmission side due to the wedge mechanism 110. The fulcrum ring 105 moves until the projection 105b is brought into contact with the thick shank portion 113b of the bolt 113. Consequently, as shown in FIG. 7, the attitude of the diaphragm spring 104 is maintained at the initial attitude shown in FIG. 4. Particularly, the fulcrum ring 105 axially moves the space W2 equal to the amount W1 of wear, so that the diaphragm spring 104 more precisely maintains its initial attitude than in the prior art.

Since the diaphragm spring 104 always maintains the initial load and attitude, the follow effects can be achieved.

(a) The friction facing 152 can be sufficiently used until its wear reaches allowable limit, so that the clutch can have an increased lifetime.

(b) Since the pressing load can be kept constant, the clutch can keep an intended torque transmitting performance during operation.

(c) The release characteristics do not change, so that the releasing operation can be always performed with a constant release load.

Further, according to the clutch cover assembly 100, it is not necessary to form a tapered surface at the bushing 114 or others, the structure can be simple. Also, the number of parts can be much smaller than that in the prior art.

Since the end of the strap plate 117 is fixed to the bolt 113 of the restricting mechanism 107, it is not necessary to provide an additional part or member for fixing the same to the pressure plate consequently, the number of parts can be reduced, and the structure can be simple.

In this embodiment, the biasing mechanism 106 biases the fulcrum ring 105 away from the pressure plate 103 by a force which is set larger than the biasing force by the strap plate 117. Therefore, when wear is present, the fulcrum ring 105 can move relatively to the pressure plate 103 in the releasing operation.

THIRD EMBODIMENT

Embodiments to be described below have the substantially same structures as that of the foregoing embodiment, and can achieve similar effects. Only those structural elements that differ from those already described will be described below.

Figure 8:
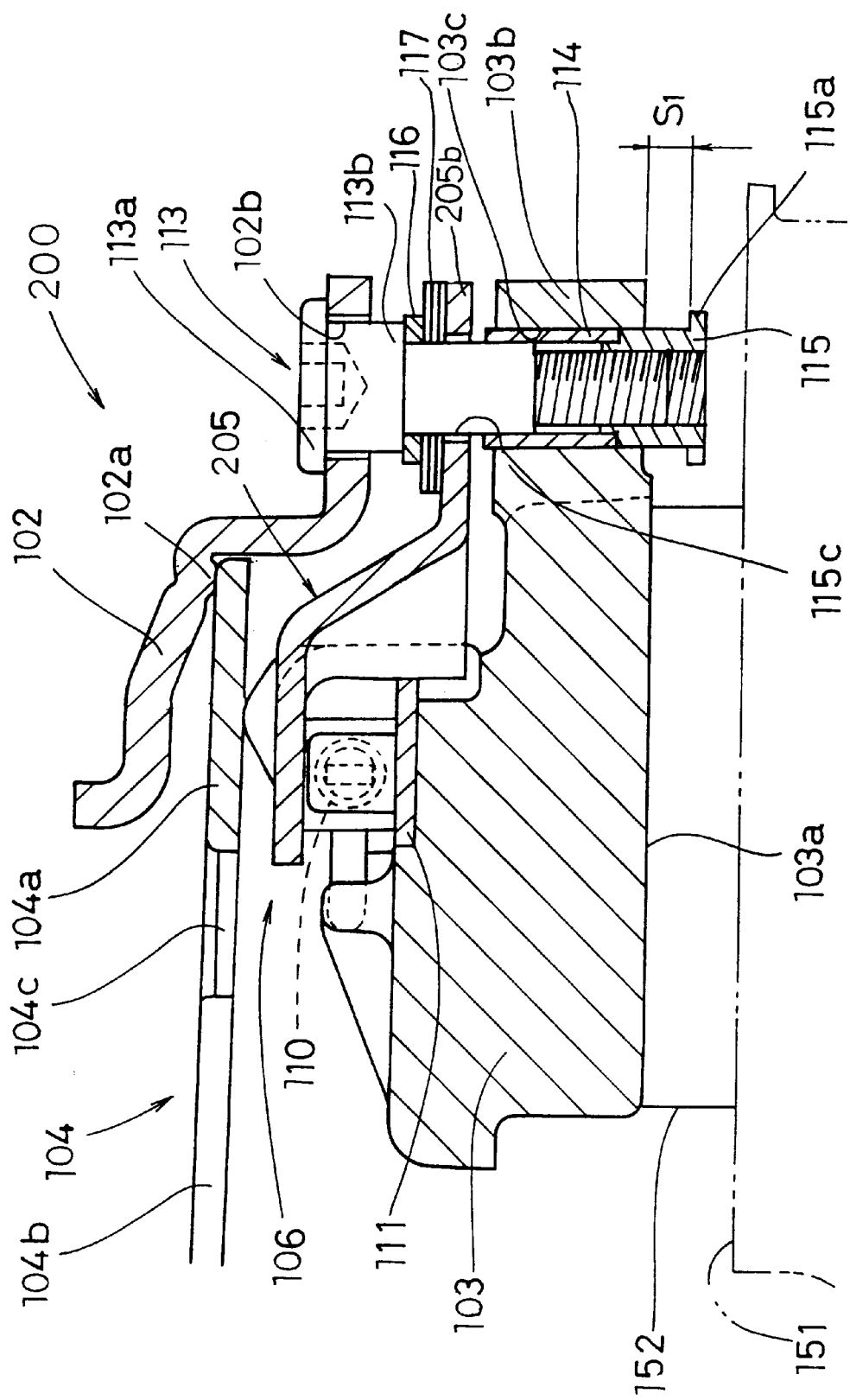
FIG. 8 is a fragmentary, schematic cross section of a portion of a clutch cover assembly, similar to FIG. 4, showing a third embodiment of the present invention.

As shown in FIG. 8, a clutch cover assembly 200 includes an end of the strap plate 117 is fixed to a projection 205b of a fulcrum ring 205. In this case, wear of the friction facing 152 does not change the attitude or relative position of the fulcrum ring 205 with respect to the clutch cover 102. More specifically, each strap plate 117 keeps a generally constant attitude, and therefore changes in its biasing force may be suppressed.

FOURTH EMBODIMENT

Figure 9:
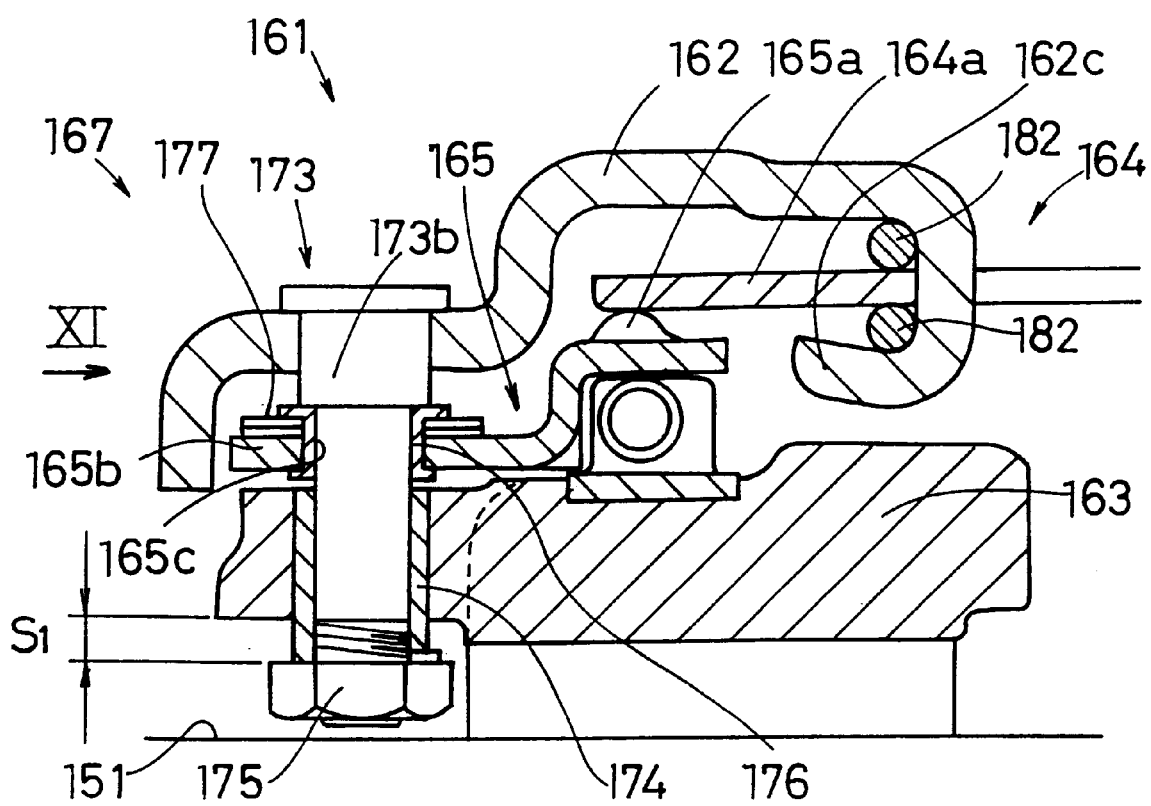
FIG. 9 is a fragmentary, schematic cross section of a portion of a clutch cover assembly showing a fourth embodiment of the present invention.
Figure 10:
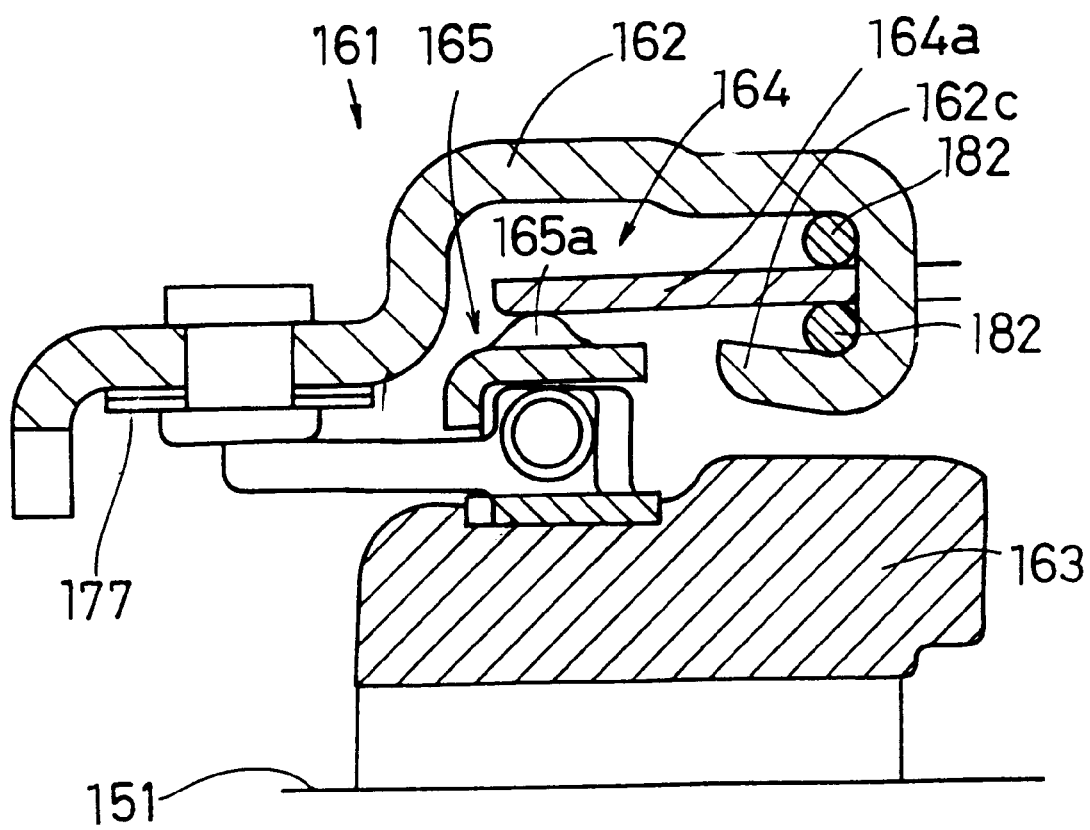
FIG. 10 is a fragmentary, schematic cross section of the clutch cover assembly depicted in FIG. 9, showing a different portion of a clutch cover assembly.
Figure 11:
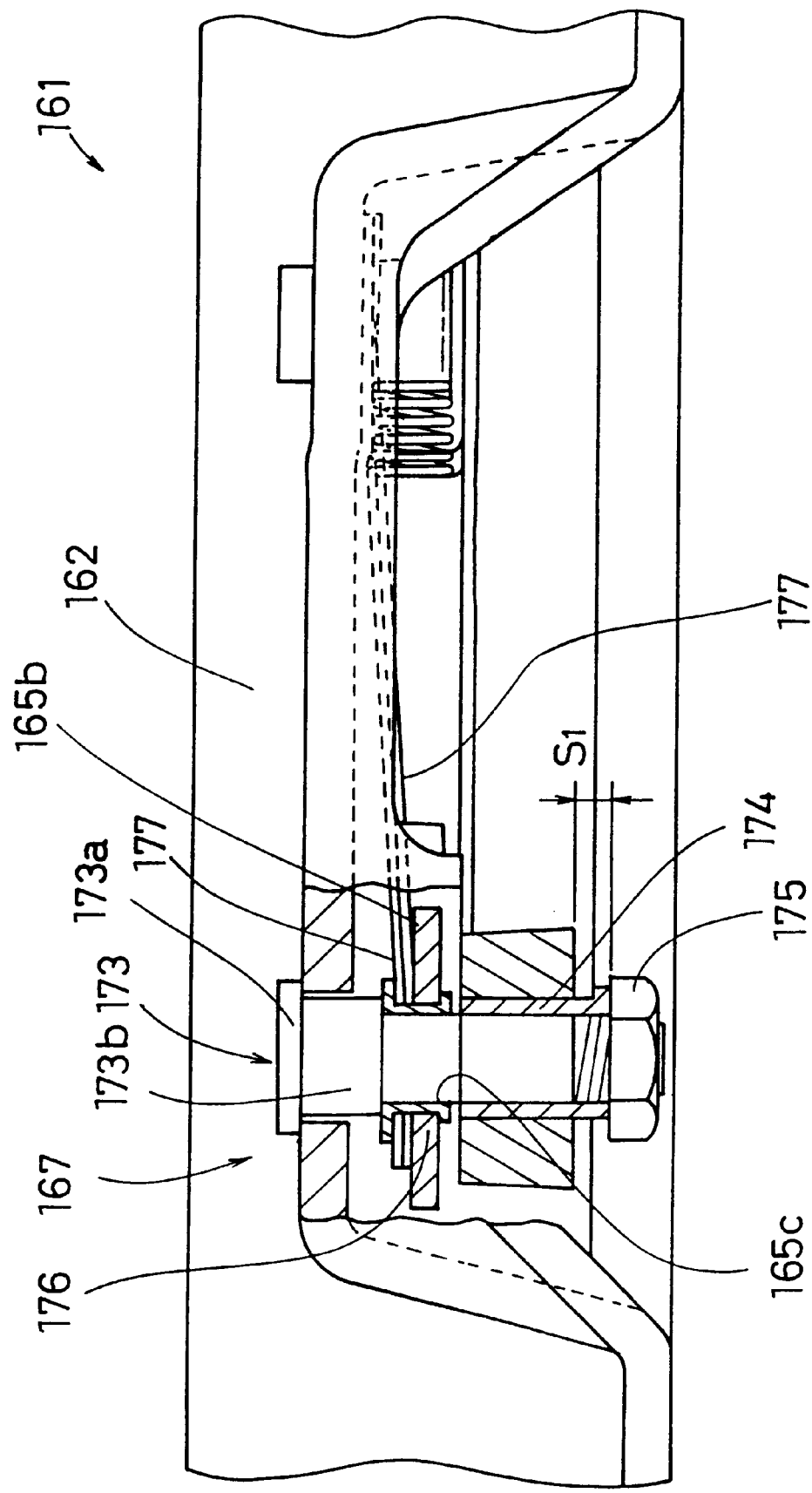
FIG. 11 is a fragmentary, part cross-sectional, part elevational side view of the clutch cover assembly depicted in FIG. 9, looking in the direction of the arrow XI in FIG. 9.

A clutch cover assembly 161 shown in FIGS. 9, 10 and 11 is for use in a push type clutch mechanism. An annular elastic portion 164a of a diaphragm spring 164 is supported at its inner peripheral portion by tabs 162 extending from a clutch cover 162 and two wire rings 182. The outer peripheral portion of the elastic portion 164a is in contact with a support portion 165a of a fulcrum ring 165. A nut 175 is engaged with an end of a bolt 173. The nut 175 is unrotatably engaged with a bushing 174. A space is ensured between the nut 175 and the flywheel 151. A space S1 is ensured between the nut 175 and the pressure plate 163. An end of a strap plate 177 is fixed to a projection 165a of the fulcrum ring 165 by a cylindrical member 176. The cylindrical member 176 is fixed into a third aperture 165c in the projection 165b. A shank of the bolt 173 extends through the cylindrical member 176. An end of the cylindrical member 176 is in contact with a thick shank portion 173b of the bolt 173. This embodiment can achieve effects similar to those by the foregoing embodiments.

FIFTH EMBODIMENT

Figure 12:
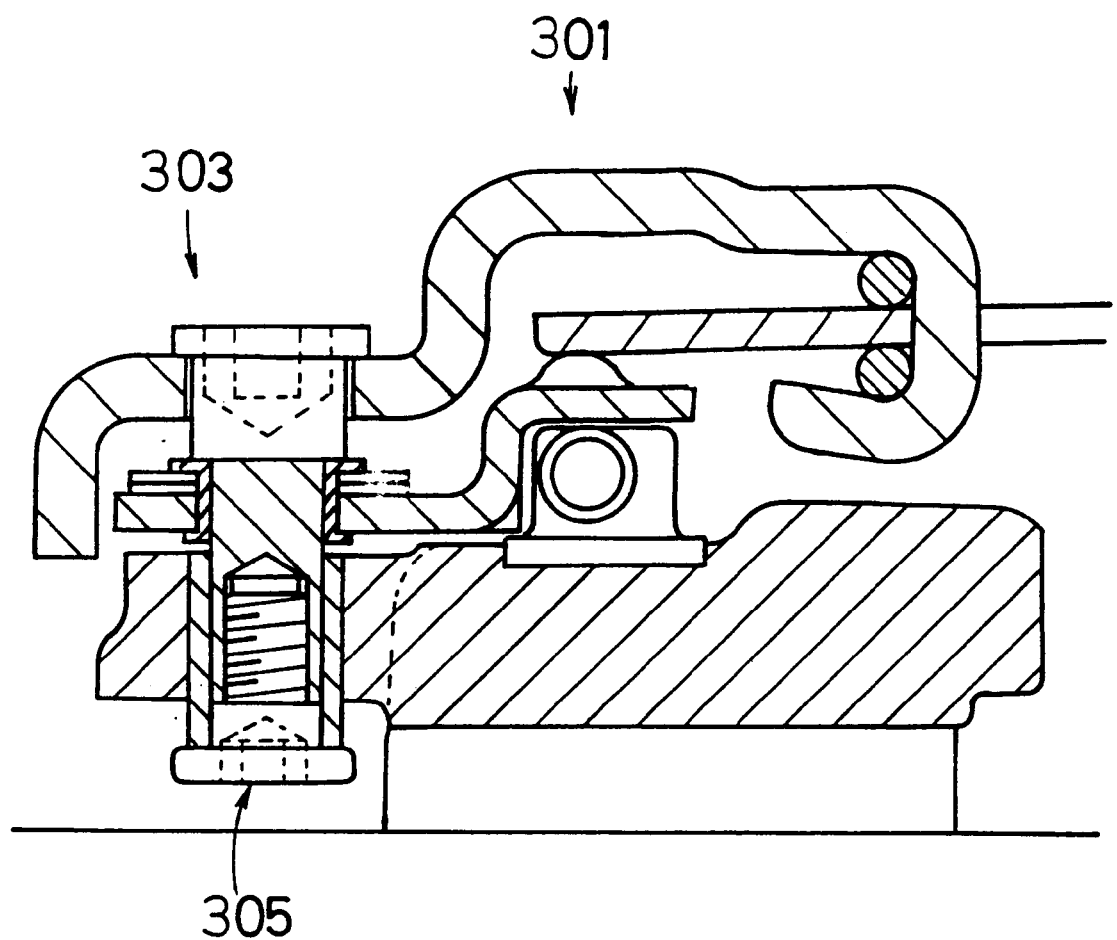
FIG. 12 is a fragmentary, schematic cross section of a portion of a clutch cover assembly showing a fifth embodiment of the present invention.

A clutch cover assembly 301 shown in FIG. 12 has a structure similar to those of the foregoing embodiments. In this embodiment, a columnar member 303 is used instead of a bolt, and a bolt 305 is used instead of a nut. The bolt 305 is screwed into the cylindrical member 303.

(Modification)

The restricting mechanism may be formed of parts other than the bolt, sleeve, bushing and nut employed in the foregoing embodiments.

According to the clutch cover assembly of the invention, the restricting mechanism is carried not by the flywheel but by the clutch cover for moving the pressure plate in accordance with the wear, so that the restricting mechanism is suppressed from being adversely affected by heat of the flywheel.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A clutch cover assembly for engaging and dis-engaging a friction member with a flywheel, comprising:

a clutch cover configured to be connected to a flywheel;

a pressure plate disposed within said clutch cover, said pressure plate provided with a friction engaging surface for engagement with a friction member;

a diaphragm spring disposed in said clutch cover for biasing said pressure plate toward said flywheel;

a fulcrum ring disposed between said pressure plate and said diaphragm spring, said diaphragm spring pivotable about a portion of said fulcrum ring;

a biasing mechanism disposed between said pressure plate and said fulcrum ring for urging said fulcrum ring away from said flywheel;

a restricting mechanism supported on said clutch cover, said restricting mechanism also supporting said fulcrum ring and being frictionally engaged with said pressure plate for restricting movement of said pressure plate with respect to said fulcrum ring, said restricting mechanism moving with respect to said pressure plate in response to wear of the friction member, said restricting mechanism comprising a bolt extending into a first aperture formed in said clutch cover, said bolt further extending into a bushing, said bolt and bushing extending through a second aperture formed in said pressure plate; and said bushing frictionally engaged within said second aperture formed in said pressure plate; and said fulcrum ring is formed with a third aperture through which said bolt extends, and said third aperture has a diameter larger than said second aperture;

said bolt has a body extending through said first, second and third apertures, and a head contacting a transmission side of said clutch cover and said head has a larger diameter than said first aperture; and said bushing is force fitted into said second aperture and said bushing is configured for movement with said bolt in response to wear of the friction member.

2. The clutch cover assembly according to claim 1, further comprising a strap plate connected to said clutch cover and said strap plate connected to said restricting mechanism between said pressure plate and said fulcrum ring.

3. The clutch cover assembly according to claim 1, further comprising a strap plate connected to said clutch cover and said strap plate connected to said restricting mechanism between said clutch cover and said fulcrum ring.

4. The clutch cover assembly according to claim 1, wherein said diaphragm spring and said fulcrum ring are configured for use in a pull type clutch mechanism.

5. The clutch cover assembly according to claim 1, wherein said diaphragm spring and said fulcrum ring are configured for use in a push type clutch mechanism.

6. The clutch cover assembly according to claim 1, wherein said bushing is further configured for limiting axial movement of said bolt in a first axial direction.

7. The clutch cover assembly according to claim 6, wherein said bushing is formed with a sleeve portion and a stop portion, said sleeve portion being fitted into said second aperture, said stop portion having a diameter larger than a diameter of said sleeve portion, said stop portion being configured for contact with said flywheel in response to wear of the friction member thus limiting axial movement in the first axial direction of said bolt.

8. The clutch cover assembly according to claim 7, wherein with the friction member in an unworn condition said stop portion is spaced apart from said pressure plate by a predetermined distance.

9. A clutch cover assembly for engaging and dis-engaging a friction member with a flywheel, comprising:

a clutch cover configured to be connected to a flywheel;

a pressure plate disposed within said clutch cover, said pressure plate provided with a friction engaging surface for engagement with a friction member;

a diaphragm spring disposed in said clutch cover for biasing said pressure plate toward said flywheel;

a fulcrum ring disposed between said pressure plate and said diaphragm spring, said diaphragm spring pivotable about a portion of said fulcrum ring;

a biasing mechanism disposed between said pressure plate and said fulcrum ring for urging said fulcrum ring away from said flywheel;

a restricting mechanism supported on said clutch cover, said restricting mechanism also supporting said fulcrum ring and being frictionally engaged with said pressure plate for restricting movement of said pressure plate with respect to said fulcrum ring, said restricting mechanism moving with respect to said pressure plate in response to wear of the friction member, said restricting mechanism comprising a bolt extending into a first aperture formed in said clutch cover, said bolt further extending into a bushing, said bolt and bushing extending through a second aperture formed in said pressure plate;

said fulcrum ring is formed with a third aperture through which said bolt extends, and said third aperture has a diameter larger than said second aperture;

said bolt has a body extending through said first, second and third apertures, and a head contacting a transmission side of said clutch cover and said head has a larger diameter than said first aperture; and said bushing frictionally engaged within said second aperture formed in said pressure plate, said bushing being force fitted into said second aperture and said bushing is further configured for limiting axial movement of said bolt in a first axial direction.

10. The clutch cover assembly according to claim 9, wherein said bushing is configured for movement with said bolt in response to wear of the friction member.

11. The clutch cover assembly according to claim 10, wherein said bushing is formed with a sleeve portion and a stop portion, said sleeve portion being fitted into said second aperture, said stop portion having a diameter larger larger than a diameter of said sleeve portion, said stop portion being configured for contact with said flywheel in response to wear of the friction member thus limiting axial movement in the first axial direction of said bolt.

12. The clutch cover assembly according to claim 11, wherein with the friction member in an unworn condition said stop portion is spaced apart from said pressure plate by a predetermined distance.

13. The clutch cover assembly according to claim 12, further comprising a strap plate connected to said clutch cover and said strap plate connected to said restricting mechanism between said pressure plate and said fulcrum ring.

14. The clutch cover assembly according to claim 9, further comprising a strap plate connected to said clutch cover and said strap plate connected to said restricting mechanism between said clutch cover and said fulcrum ring.

15. The clutch cover assembly according to claim 9, wherein said diaphragm spring and said fulcrum ring are configured for use in a pull type clutch mechanism.

16. The clutch cover assembly according to claim 9, wherein said diaphragm spring and said fulcrum ring are configured for use in a push type clutch mechanism.

17. A clutch cover assembly for engaging and disengaging a friction member with a flywheel, comprising:

a clutch cover configured to be connected to a flywheel;

a pressure plate disposed within said clutch cover, said pressure plate provided with a friction engaging surface for engagement with a friction member;

a diaphragm spring disposed in said clutch cover for biasing said pressure plate toward said flywheel;

a fulcrum ring disposed between said pressure plate and said diaphragm spring, said diaphragm spring pivotable about a portion of said fulcrum ring;

a biasing mechanism disposed between said pressure plate and said fulcrum ring for urging said fulcrum ring away from said flywheel;

a restricting mechanism supported on said clutch cover, said restricting mechanism also supporting said fulcrum ring and being frictionally engaged with said pressure plate for restricting movement of said pressure plate with respect to said fulcrum ring, said restricting mechanism moving with respect to said pressure plate in response to wear of the friction member, said restricting mechanism comprising a bolt extending into a first aperture formed in said clutch cover, said bolt further extending into a bushing, said bolt and bushing extending through a second aperture formed in said pressure plate; and said fulcrum ring is formed with a third aperture through which said bolt extends, and said third aperture has a diameter larger than said second aperture;

said bolt has a body extending through said first, second and third apertures, and a head contacting a transmission side of said clutch cover and said head has a larger diameter than said first aperture; and a restricting member configured to limit axial movement of said bolt in a first axial direction.

18. The clutch cover assembly according to claim 17, wherein said restricting member is formed on a bushing that is configured for movement with said bolt in response to wear of the friction member.

19. The clutch cover assembly according to claim 18, wherein said bushing is frictionally engaged within said second aperture formed in said pressure plate and said restricting member is formed on a distal end of said bushing.

20. The clutch cover assembly according to claim 19, wherein said bushing is formed with a sleeve portion and a stop portion, said sleeve portion being fitted into said second aperture, said stop portion having a diameter larger than a diameter of said sleeve portion, said stop portion being configured for contact with said flywheel in response to wear of the friction member thus limiting axial movement in the first axial direction of said bolt.

21. The clutch cover assembly according to claim 20, wherein with the friction member in an unworn condition said stop portion is spaced apart from said pressure plate by a predetermined distance.

22. The clutch cover assembly according to claim 21, further comprising a strap plate connected to said clutch cover and said strap plate connected to said restricting mechanism between said pressure plate and said fulcrum ring.

23. The clutch cover assembly according to claim 17, further comprising a strap plate connected to said clutch cover and said strap plate connected to said restricting mechanism between said clutch cover and said fulcrum ring.

24. The clutch cover assembly according to claim 17, wherein said diaphragm spring and said fulcrum ring are configured for use in a pull type clutch mechanism.

25. The clutch cover assembly according to claim 17, wherein said diaphragm spring and said fulcrum ring are configured for use in a push type clutch mechanism.

\* \* \* \* \*